J. J. ARMSTRONG.
HOSE COUPLING.
APPLICATION FILED MAR. 22, 1920.
1,437,082.
Patented Nov. 28, 1922.
2 SHEETS—SHEET 2.
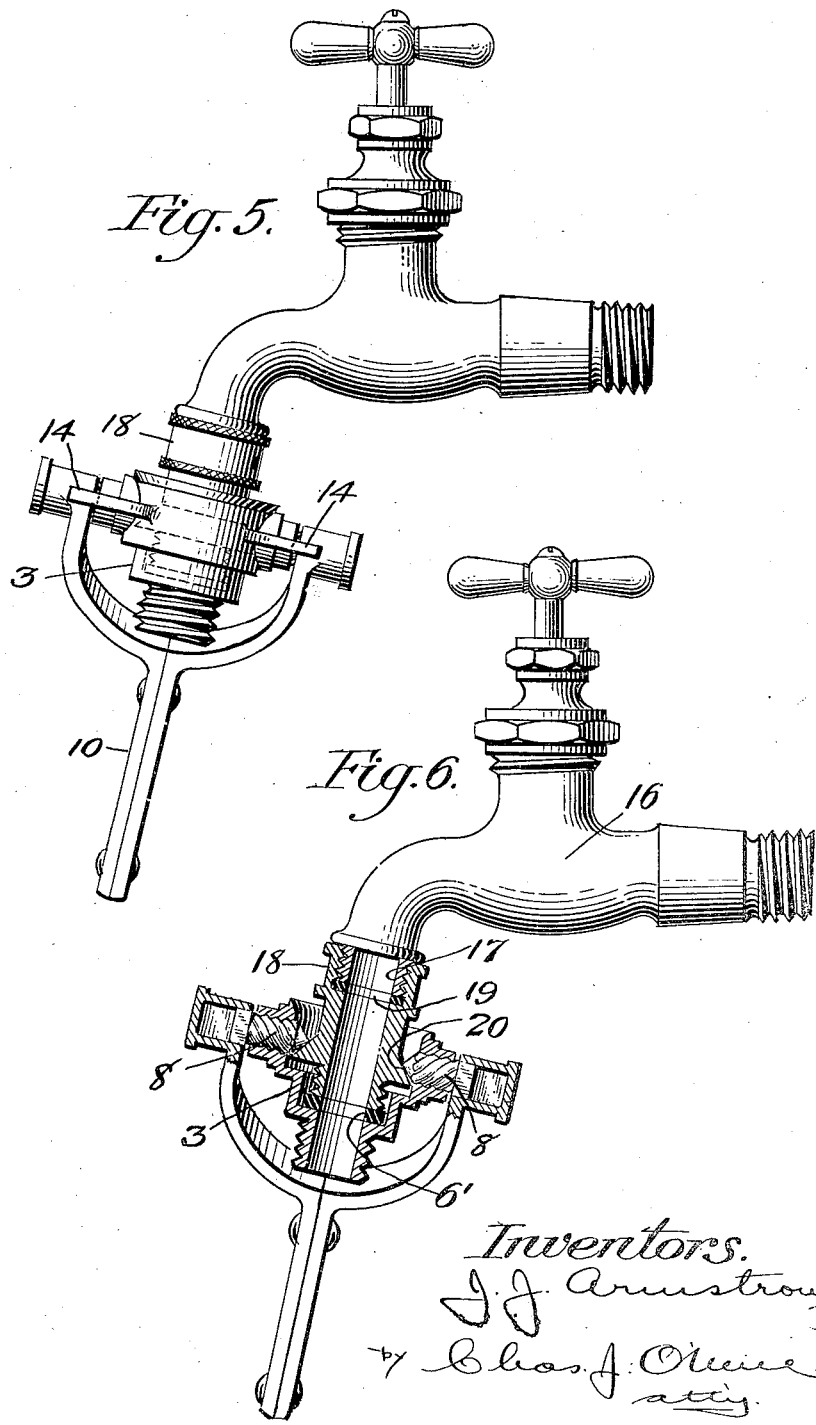

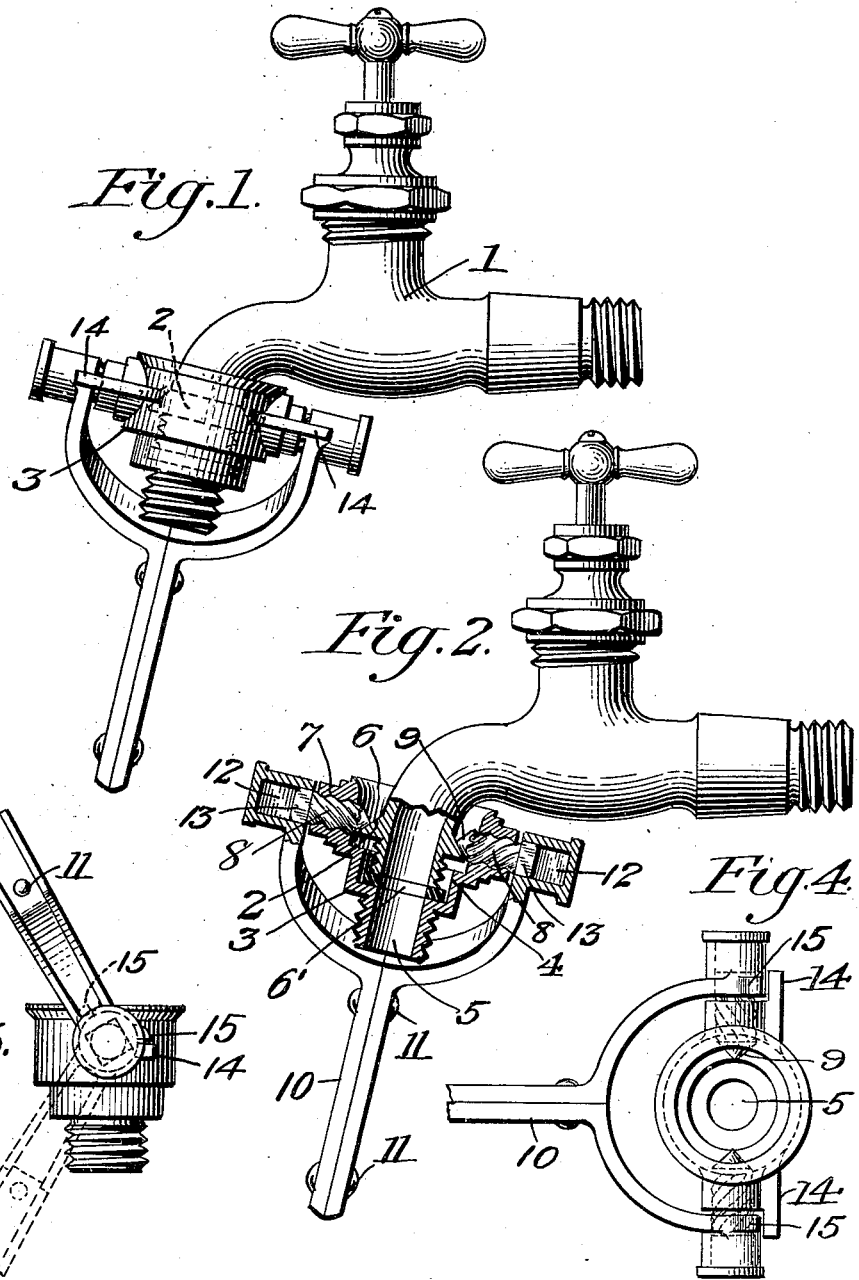

Patented Nov. 28, 1922.

1,437,082

UNITED STATES PATENT OFFICE.

JOHN JAMES ARMSTRONG, OF HONOLULU, TERRITORY OF HAWAII, ASSIGNOR OF ONE-HALF TO ROBERT B. BOOTH, HONOLULU, TERRITORY OF HAWAII.

HOSE COUPLING.

Application filed March 22, 1920. Serial No. 367,755.

*To all whom it may concern:*

Be it known that I, JOHN J. ARMSTRONG, a citizen of the United States, residing at Honolulu, in the county of Oahu, in the Territory of Hawaii, have invented certain new and useful Improvements in Hose Couplings; and I do hereby declare the following to be a full, clear, and exact description of the invention, such as will enable others skilled in the art to which it appertains to make and use the same.

The attachment of a garden or other hose to a faucet is always a matter of considerable inconvenience, since it is necessary to screw the hose coupling upon the screw threads of the faucet. Furthermore, the operation requires some degree of particularity in that the hose coupling must be screwed into such a position as to cause the compression of the ordinary washer to prevent the leaking of the water or other fluid during the use of the hose.

It is an object of the present invention to provide a hose coupling of such a character that its attachment to a faucet may be accomplished with the minimum consumption of time and energy and yet in such a manner that the leaking of the fluid during the use of the coupling will be prevented. Furthermore, the device is so constructed that it may either be attached to a special faucet or to the ordinary screw-threaded faucet.

In the drawing:

Fig. 1 is a side elevation of a faucet with my device attached thereto;

Fig. 2 is a partial sectional view;

Fig. 3 is a fragmental side elevation illustrating the operating lever stops;

Fig. 4 is a plan view of the coupling;

Fig. 5 is an elevational view showing the coupling attached to the ordinary faucet and showing the use of the adapter; and Fig. 6 is a sectional view thereof.

Referring particularly to Figs. 1 to 4, inclusive, I have illustrated a faucet 1, which is provided adjacent to its outlet with a substantially frusto-conical flange 2, the upper or inclined face of which forms a cam surface. The form of the hose coupling here illustrated includes a socket member 3 which is adapted to receive the end of the faucet 1, being provided with a restricted chamber 4 adjacent to the outlet end 5 and an enlarged chamber 6, the former being for the reception of the end of the faucet and the latter for the reception of the flange 2. A suitable washer 6' is disposed within the chamber 4 and is adapted to seal the joint between the socket member 3 and the end of the faucet 1. The socket member 3 is provided at diametrically opposite points with screw-threaded apertures 7, in which cams 8 are mounted for reciprocation, the cams having threaded shanks which engage the screw threads of the apertures and having conical cam ends 9 which are arranged to engage the cam surface of the flange 2. When the cams are projected inwardly into the socket member 3 the cams 9 will engage the flange 2 and maintain the socket member in place. Furthermore, the action of the cams 9 riding on the flange 2 will force the washer or gasket 6 and the end of the faucet 1 together, so as to make the joint between the two tight and it will, of course, force the washer against the shoulder of the socket member. Of course, on the other hand, when the cams 8 are retracted so that the ends 9 lie within the apertures 7, the socket member may be removed from the faucet.

In order that the cams 8 may be projected from the apertures or retracted within the same, an operating lever 10 is provided, which lever is made, preferably, of two portions riveted together at 11 and which is bifurcated at one end. The ends of the arms of the lever 10 are provided with sockets 12 which are angular in cross section, the particular socket shown being rectangular. It is, of course, to be understood that the socket need not be rectangular, as the essential requirement is that it be angular. The outer ends 13 of the cams 8 are angular in form and similar to the form of the flanges 12. These outer ends are slidable in the sockets so that when the lever 10 is rotated on the cams 8 as a pivot, the latter will be advanced or retracted, the ends or heads 13 sliding in the sockets 12. It will be realized if the ends 13 of the cams reach the inner ends of the sockets 12, the force applied to the lever would tend to spread the bifurcated ends of the same. Therefore, to overcome this difficulty, the socket member 3 has been provided with stops 14, which are engaged by complemental stops 15 on the ends of the lever 10, when the latter reaches such a position that the ends 13 of the cams are slightly spaced from the inner ends of the sockets 12.

In use the socket member 2 is placed upon the end of the faucet 1, with the lever 10 in such a position that the ends 9 of the cams 8 will be retracted to such an extent that the flange 2 will enter the chamber 6 and the end of the faucet will abut against the washer or gasket 6'. The lever 10 is then swung to such a position as illustrated in Fig. 2, for instance, so that the cams 8 are projected inwardly from the apertures 7 and the cam ends 9 are caused to ride upon the cam face of the flange 2. This will serve to bind the socket member 3 in place and will also act to compress the washer or gasket 6' so as to render the joint between the faucet and socket member fluid-tight. It will be observed that inasmuch as the flange 2 is substantially frusto-conical the socket member 3 may be placed upon the faucet in any position whatever, inasmuch as the cam ends 9 will co-operate with any portion of the cam face of the flange 2. This will greatly facilitate the application of the device to the faucet, since no particular position need be selected before such application.

In Figs. 5 and 6 of the drawing, I have illustrated a device attached to the ordinary faucet 16, which is provided on its end with screw threads 17. An adapter which is indicated generally by the reference character 18 has a screw-threaded socket in one end thereof for the reception of the screw-threads 17 of the faucet and is provided with a washer 19 to make the joint between the adapter and the faucet fluid-tight. This adapter has adjacent to its lower end a frusto-conical flange 2 similar to the flange on the faucet 1 of the form illustrated in Figs. 1 to 4 inclusive. The lower end of this adapter 18 abuts against the washer 6' of the socket member 3 and the cams 8 cooperate with the cam face of this flange 20 in the same manner as they co-operate with the flange 2 of the faucet 1. The operation of this socket member is identical when it is used in conjunction with the faucet or when it is used in conjunction with the adapter. The purpose of the adapter is to make the socket member applicable to the ordinary faucet and to obviate the necessity for the construction of a faucet which is provided with a flange, such as illustrated in Fig. 2 of the drawing.

When the socket member is attached to the adapter, it operates in the same manner as when it is attached directly to the faucet and it may be attached to the adapter in any desired position, inasmuch as the flange 20 of the adapter is frusto-conical and the cam face thereof is continuous.

It will be seen from the above description that I have produced a hose coupling device by means of which the hose may be attached to and detached from a faucet with great facility and which will insure the proper attachment so that none of the fluid passing through the faucet and the hose will leak from the joints between the hose and the faucet.

What I claim is:

1. A hose coupler for faucets, comprising a socket member having a hose-receiving portion and a chamber disposed above the same, a cam flange fixed with relation to the faucet and adapted to enter the chamber, cams carried by the socket member and adapted to be projected within said chamber to engage the cam flange, and a common means for projecting said cams.

2. A hose coupler for faucets, comprising a socket member having a hose-receiving portion and having screw-threaded apertures therein, cam members extending through said apertures and having screw threads engaging the threads of the apertures, said cam members having cam heads on the inner ends thereof and having angular outer ends, a bifurcated operating lever having angular sockets within which said angular ends of the cams are slidably located, and a cam flange stationary with respect to the faucet and adapted to be engaged by the cam heads on the ends of the aforementioned cams.

3. A hose coupler for faucets, comprising a socket member having a hose-receiving portion and having screw-threaded apertures therein, cam members extending through said apertures and having screw threads engaging the threads of the apertures, said cam members having cam heads on the inner ends thereof and having angular outer ends, a bifurcated operating lever having angular sockets within which said angular ends of the cams are slidably located, means for limiting the movement of the operating lever, and a cam flange stationary with respect to the faucet and adapted to be engaged by the cam heads on the ends of the aforementioned cams.

4. A hose coupler for faucets, comprising a socket member having a hose-receiving portion and a chamber disposed above the same, cams carried by the socket member and adapted to be projected within said chamber to engage and have a cooperative cam-action with the discharge end of the faucet, and a common means for projecting said cams.

5. A hose coupler for faucets, comprising a socket member having apertures therein, cam members extending through said apertures, adapted to engage and have cooperative cam action with the discharge end of the faucet, and a common means for simultaneously advancing and retracting the cam members within the apertures, to operative and inoperative positions.

In testimony whereof I affix my signature.

JOHN JAMES ARMSTRONG.